United States Patent [19]

Akitomo et al.

[11] Patent Number: 5,391,336
[45] Date of Patent: Feb. 21, 1995

[54] METHOD FOR FABRICATING FOAM GASKETS

[75] Inventors: Hiroshi Akitomo; Tsugio Nozoe; Hideo Shinmi, all of Chiba, Japan

[73] Assignee: Dow Corning Toray Silicone Co., Ltd., Tokyo, Japan

[21] Appl. No.: 173,312

[22] Filed: Dec. 23, 1993

[30] Foreign Application Priority Data

Dec. 28, 1992 [JP] Japan .................. 4-361140

[51] Int. Cl.$^6$ .................................. B29C 67/22
[52] U.S. Cl. ........................... 264/46.4; 264/50; 264/328.6
[58] Field of Search ............ 264/46.4, 50, 51, 252, 264/328.6

[56] References Cited

U.S. PATENT DOCUMENTS

| 4,032,502 | 6/1977 | Lee et al. | 264/328.6 |
| 4,333,898 | 6/1982 | Schmidtchen | 264/50 |
| 4,340,709 | 7/1982 | Jeram et al. | 264/328.6 |
| 4,391,765 | 7/1983 | Lee et al. | 264/26 |
| 4,442,060 | 4/1984 | Bouverot et al. | 264/328.6 |
| 4,473,667 | 9/1984 | Sands | 264/45.3 |
| 4,528,354 | 7/1985 | McDougal | 264/328.6 |
| 4,547,529 | 10/1985 | Lee et al. | 521/122 |
| 4,792,425 | 12/1988 | Weaver | 264/328.6 |
| 4,839,122 | 6/1989 | Weaver | 264/328.6 |
| 5,139,715 | 8/1992 | Katsuno et al. | 264/46.4 |
| 5,175,171 | 12/1992 | Shinmi et al. | 521/79 |

FOREIGN PATENT DOCUMENTS

| 0227233 | 10/1986 | European Pat. Off. | C08L 10/86 |
| 0416516 | 9/1990 | European Pat. Off. | C08J 9/02 |
| 0429014 | 11/1990 | European Pat. Off. | C08L 83/07 |

Primary Examiner—Allan R. Kuhns
Attorney, Agent, or Firm—Robert Spector

[57] ABSTRACT

A method for fabricating foam gaskets is characterized in that during the separate transport and subsequent mixing in an enclosed chamber of the base and curing agent portions of a two part foamable and curable organosiloxane composition an inert gas is injected in the amount of from 1 to 50 mL per 100 g of the total curable organosiloxane composition. The gas is injected into either the base portion, the curing agent or during or immediately after mixing of the two portions, and the resultant foamable composition is then extruded from a nozzle onto the seal region of the substrate and cured while foaming.

5 Claims, 1 Drawing Sheet 0451,336

METHOD FOR FABRICATING FOAM GASKETS

BACKGROUND OF THE INVENTION

1. Field of the Invention

The present invention relates to the fabrication of foam gaskets. More particularly, this invention relates to a method for fabricating gaskets from foamable organosiloxane compositions. The gaskets can be used on the sealing surfaces of automobile parts and electric/electronic components.

2. Background Information

Organosiloxane compositions that foam while curing, hereinafter referred to as foamable organosiloxane compositions, are well known and are used, for example, as sealants for perforated parts in nuclear power stations. Because of its limited storage stability under ambient conditions this type of foamable organosiloxane composition is generally Stored in two parts as two parts, typically referred to as base and curing agent, and a foam is produced by mixing the two parts, thereby initiating the simultaneous foaming and curing reactions.

Foam gaskets prepared from foamable, curable organosiloxane compositions have recently begun to be used at the seal regions of various types of objects such as automobile headlights, lids and covers for various types of containers, and waterproof casings for automotive electronic components. These end use applications are described in Japanese Laid Open Patent Application [Kokai or Unexamined]Number Hei 3-94876 [94,876/1991 ]). A disadvantage of the fabrication method described in this patent publication is that when the two liquid parts of a foamable organosiloxane composition are mixed in an enclosed system, a foam gasket having the desired uniform, small cells is not always obtained. In particular, foam having nonuniform cells is the only product obtained using high-viscosity foamable organosiloxane compositions.

Injecting a compressed inert gas such as air into a foamable, curable organosiloxane compositions to stabilize the cell structure of the resultant foam is described in commonly assigned U.S. Pat. No. 5,175,171, however no criticality with respect to the amount of air injected based on the amount of foamable composition is disclosed.

When a foamable organosiloxane compositions is used to fabricate foam gaskets, it is first extruded into a bead after mixing in a mixer, and after extrusion it must maintain this bead shape until foaming has begun. The maintenance of a high viscosity is therefore required, with the result that a foam gasket having uniform cells cannot be obtained.

An objective of the present invention is to provide a stable, method for fabricating large quantities of foam gaskets with uniformly small cells.

SUMMARY OF THE INVENTION

Gaskets exhibiting a homogeneous distribution of uniformly small cells can be fabricated from a foamable curable organosiloxane composition by injecting a controlled volume of an inert gas into the base potion or curing agent portion of a foamable organosiloxane composition or a mixture of the ingredients from these portions, and blending the ingredients in a mixer to obtain a finely divided dispersion of the gas in the composition.

DETAILED DESCRIPTION OF THE INVENTION

This invention provides a method for fabricating foam gaskets, said method comprising the sequential steps of 1) transporting to a mixing chamber the ingredients of a curable organosiloxane composition as a base portion and a curing agent portion, where the composition formed by combining said base and curing agent portions foams by reaction of silicon bonded hydrogen atoms with hydroxyl groups and cures by a hydrosilation reaction, 2) blending said base portion with said curing agent portion in said mixing chamber to form said foamable composition, 3) extruding from said mixing chamber through an orifice on to the seal region of a substrate, and 4) allowing said to composition to foam and cure to form a gasket exhibiting a homogeneous distribution of uniformly small cells, where prior to extrusion from said mixing chamber said base portion, said curing agent portion or said composition is injected with an amount of an inert gas equivalent to from 1 to 50 ml of gas per 100 g of said composition and said gas is uniformly dispersed throughout said composition prior to extrusion of said composition from said mixing chamber.

BRIEF DESCRIPTION OF THE FIGURE

The Figure is a diagrammatic view of a preferred device for implementing the method

DETAILED DESCRIPTION OF THE INVENTION

Figure 1:
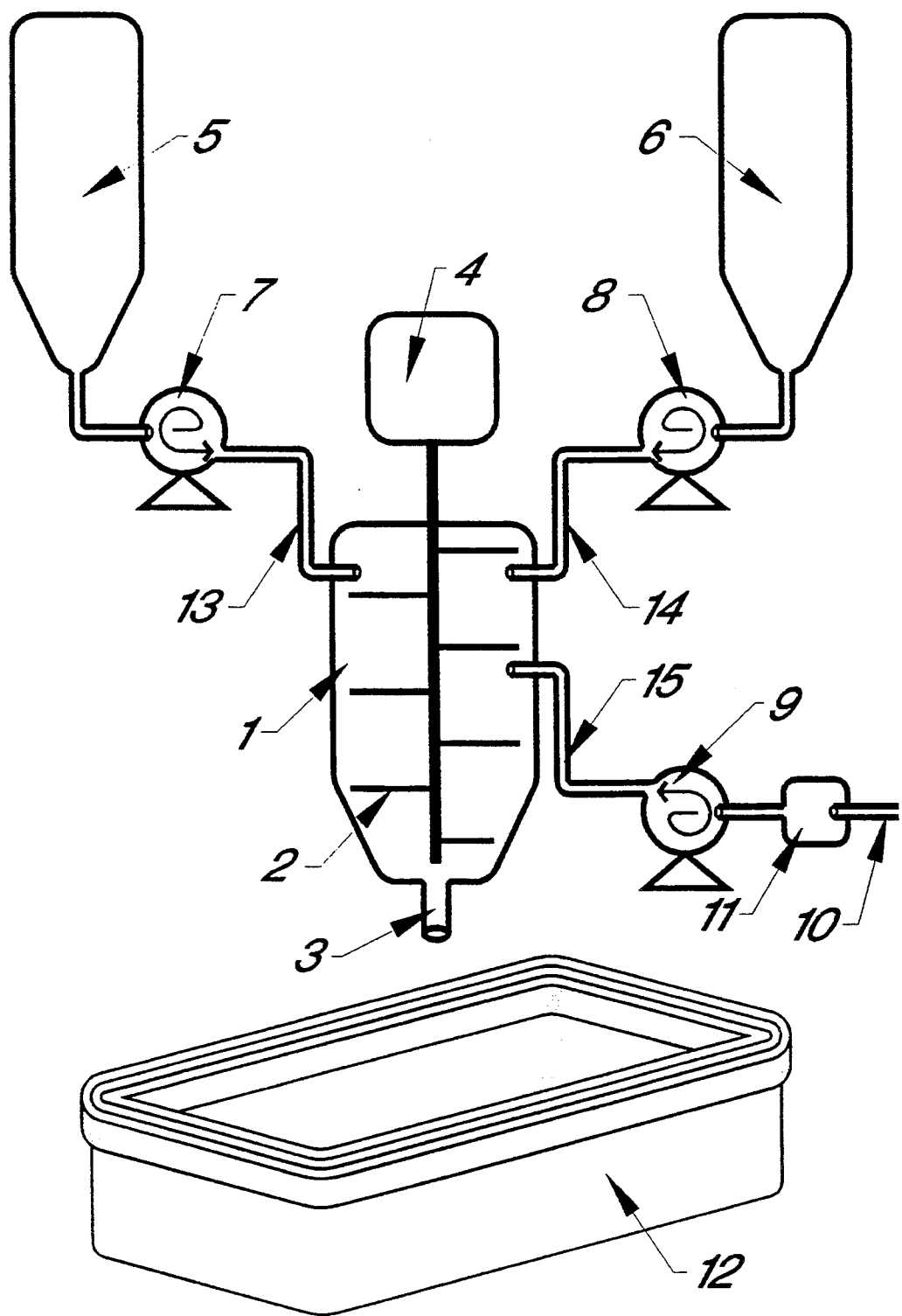

The present invention will be explained in detail with reference to the appended drawing, referred to as FIG. 1. 1 refers to a mixing chamber, whose interior is equipped with rotating blades 2 and a nozzle 3. The interior of this mixing chamber 1 is connected to storage tanks 5 and 6 through pipes 13 and 14. Each of pipes 13 and 14 is provided with a metering pump in an arbitrary position. Also connected to mixing chamber 1 is a pipe 15 equipped with a pressure-regulating valve 11 and metering pump 9. Part A, also referred to as the base portion of the foamable organosiloxane composition, is stored in tank 5 and a part B, referred to the curing agent portion of the curable organosiloxane composition, is stored in tank 6.

Parts A and B are metered out, separately transported, and introduced into mixing chamber 1 by pumps 7 and 8, respectively. Simultaneous with the introduction of parts A and B into the mixing chamber 1, a specified quantity of gas is introduced into the mixing chamber through the action of metering pump 9 with pressure regulation by pressure-regulating valve 11. Parts A, B and the gas are then mixed by the rotating blades 2. The resultant liquid mixture containing the gas as finely dispersed bubbles is extruded through the nozzle 3 at the bottom of mixing chamber 1 onto the seal region of the substrate 12. This extruded liquid mixture is then cured and foamed, either by heating or at ambient temperature, to produce the foam gasket.

The gas introduced into the mixing chamber can be, for example, air, nitrogen, argon, and the like, but the use of air is the most convenient.

The gas is introduced into the mixing chamber under a pressure of from 1 to 7 kg/cm$^2$. The amount of gas is added is critical to the foam structure of the cured gasket, and must be maintained within the range of from 1 to 50 ml per 100 g of the foamable composition resulting from the blending of parts A and B, preferably within the range of 5 to 30 ml per 100 g of the mixture of parts A and B added to the mixing chamber, which constitutes the foamable organosiloxane composition.

When the amount of gas added is below 1 ml per gram of foamable organosiloxane composition, the number of cells in the composition is small and hence the expansion ratio will be low. The cells become very large when the amount added exceeds 50 ml per gram of foamable composition, and uniform microscopic cell structure can then no longer be obtained. The average diameter of the cells in gaskets prepared in accordance with the present method preferably does not exceed 1 millimeter.

It is unclear why the fine dispersion of the gas in the mixture of fluids A and B produces a foam having the desired homogeneous distribution of uniformly small cells. One explanation is that the bubbles of the finely dispersed gas become nuclei for the hydrogen gas that is evolved during curing of the foamable organopolysiloxane composition, and this results in the production of uniform bubbles within the foam.

The foamable organosiloxane composition used in accordance with the present method preferably comprises (A) 100 parts by weight of an organopolysiloxane containing at least 2 alkenyl radicals in each molecule, (B) from 0 to 100 parts by weight of an organopolysiloxane containing at least 1 silanol group in each molecule, (C) from 1 to 20 parts by weight of an alcohol, (D) from 0 to 20 parts by weight of an organopolysiloxane containing the $C_nF_{2n+1}R$ group, where the value of n is from 1 to 10 and R represents a silicon-bonded alkenyl radical, (E) a platinum group metal or compound thereof in an amount sufficient to catalyze curing and foaming of said composition, and (F) an organohydrogenpolysiloxane in a quantity equivalent to a value of from 0.5:1 to 50:1 for the molar ratio of silicon-bonded hydrogen atoms in the organohydrogenpolysiloxane to the sum of the number of moles of alkenyl groups contained in the alkenyl-containing organopolysiloxane, ingredient A, plus the number of moles of hydroxyl groups contained in ingredients B and C.

Ingredients A through F of the present compositions will now be described in detail.

Ingredient A contains at least 2 silicon-bonded alkenyl radicals in each molecule, which are exemplified by vinyl, allyl, and hexenyl. The non-alkenyl organic groups in this ingredient are one or more species of substituted or unsubstituted monovalent hydrocarbon radicals, excluding aliphatically unsaturated radicals. Examples of suitable radicals include but are not limited to $C_1$–$C_6$ alkyl radicals such as methyl, ethyl, propyl, and butyl; aryl radicals such as phenyl and tolyl; and any of these radicals in which all or a portion of the carbon-bonded hydrogen atoms have been replaced by substituents such as halogen and the cyano group. Examples of substituted hydrocarbon radicals include but are not limited to chloromethyl, trifluoropropyl, and cyanoethyl.

Ingredient A generally has a linear molecular structure, but may contain small quantities of branched- or resin-form organopolysiloxane. The viscosity of this ingredient is generally from 100 to about 100,000 centistokes.

Ingredient B of the present compositions is an organopolysiloxane containing at least 1 silicon-bonded silanol group in each molecule. Ingredient B functions as a foaming agent for the composition by reacting with ingredient F, the organohydrogensiloxane, to produce hydrogen gas. This organopolysiloxane functions as both a crosslinker and a foaming agent when it contains 3 or more silanol groups.

Ingredient B may have a linear, cyclic, or three-dimensional network structure, or it may be a mixture of such structures. The silicon-bonded silanol groups may be present at the molecular chain terminals or along the molecular chain.

Ingredient C of the present compositions is an alcohol containing at least 1 carbon-bonded hydroxyl group. There are no specific restrictions on the type of alcohols that can be present as ingredient B. Together with ingredient B, ingredient C functions as a foaming agent for the composition by reacting with the organohydrogenpolysiloxane, ingredient F, to produce hydrogen gas. Ingredient F also reduces the viscosity of the curable organosiloxane composition.

Specific alcohols that can be used as ingredient C include but are not limited to n-propanol, n-butanol, 1,4-butanediol, 1,4-pentanediol, ethylene glycol, 1,3-propanediol, 1,5-hexanediol, propylene glycol, diethylene glycol, benzyl alcohol, octanol, 2-ethylhexanol, and isopropanol. A single alcohol or a mixture of two or more alcohols can in the present organosiloxane compositions.

The organopolysiloxane referred to in the present specification as ingredient D is optional, and is used as a foam regulator or "profoamer" to adjust the foaming properties of the present compositions. This organopolysiloxane contains at least one group per molecule with the following general formula $$C_nF_{2n+1}R$$

where n represents an integer from 1 to 10, R represents an alkylene radical such as methylene, ethylene, propylene or butylene.

Non-limiting examples of ingredient D include $CF_3$—$CH_2CH_2$ group-containing dimethylpolysiloxane, $C_2F_5$—$CH_2CH_2$ group-containing dimethylpolysiloxane, $C_3F_7$—$CH_2CH_2$ group-containing dimethylpolysiloxane, and $C_8F_{17}$—$CH_2CH_2CH_2$ group-containing dimethylpolysiloxane, etc.

The concentration of ingredient D in the present organosiloxane compositions is from 0 to 20 parts by weight per 100 parts of ingredient A, preferably from 0.5 to 15 parts by weight per 100 weight parts ingredient A.

Ingredient E is a platinum group metal catalyst that accelerates the addition reaction between ingredients A and F and the dehydrogenation reaction between ingredient F and ingredients B and C. This catalyst is exemplified by chloroplatinic acid, chloroplatinic acid/olefin complexes, and chloroplatinic acid/divinylsiloxane complexes.

Other suitable catalysts are spherical microparticulate catalysts made from a silicone resin containing at least 0.01 weight % (as platinum metal atoms) platinum catalyst. The softening point of the silicone resin is from 50° C. to 200° C. and the particle diameter of the spherical microparticulate catalyst is from 0.01 to 10 micrometers. These spherical microparticulate catalysts are particularly preferred because they can lengthen the time between the mixing of parts A and B of the present compositions and the occurrence of the viscosity rise or gelation of the composition.

Ingredient F of the present organosiloxane compositions is an organohydrogenpolysiloxane that serves as a crosslinker for ingredient A, and also generates hydrogen gas by reacting with ingredients B and C. The molecular configuration of ingredient F can be straight-chain or cyclic. The concentration of ingredient F in the present compositions is equivalent to a range of from 0.5:1 to 50:1 for the molar ratio of (a) silicon-bonded hydrogen atoms contained in ingredient F to (b) the sum of the number of moles of alkenyl radicals in ingredient A plus the number of moles of hydroxyl groups in ingredients B and C.

The curable, foamable organosiloxane compositions used in accordance with the present method are prepared in the form of a two-part compositions consisting of a base portion and a curing agent portion. The base portion is prepared by blending to homogeneity the required quantities of ingredients A, C and E with optional ingredients B and D, when these optional ingredients are present.

The curing agent portion is prepared by mixing the required quantities of ingredients A and F to homogeneity.

When the base and curing agent portions of the present compositions are subsequently mixed in the required ratio, the foaming and curing reactions develop simultaneously, either at room temperature or with heating, to yield an elastomeric foam.

In addition to the ingredients A through F described in the preceding sections of this specification, the foamable organosiloxane composition used in accordance with the present method can contain one or more of the following optional ingredients, so long as these ingredients do not interfere with achieving the objectives of the present invention: fillers such as fumed silica, precipitated silica, titanium dioxide, aluminum oxide, aluminum hydroxide, quartz powder, talc, crushed mineral silica, zinc oxide, calcium carbonate, and so forth; fibrous fillers such as glass fibers, mineral fibers, and organic fibers; colorants such as dyes and pigments; heat stabilizers such as iron oxide red, carbon black, cerium oxide, and so forth; cold-resistance agents; adhesion promoters such as silane coupling agents, etc.; and platinum catalyst inhibitors such as methylbutynol.

The following examples describe preferred embodiments of the present method and compositions suitable for use in accordance with this method. The examples should not be interpreted as limiting the scope of the present invention as defined in the accompanying claims. Unless specified to the contrary all parts and percentages in the examples are by weight, viscosities are the values measured at 25° C. and cs is an abbreviation for centistokes.

EXAMPLE 1

Part A of a curable foamable organosiloxane composition was prepared by blending the following ingredients to homogeneity: 100 parts of a dimethylvinylsiloxy-terminated dimethylpolysiloxane exhibiting a degree of polymerization of approximately 500 and a viscosity of 15,000 cs ($15 \times 10^{-3}$ m$^2$/sec.), 50 parts of a silanol-terminated dimethylpolysiloxane exhibiting a degree of polymerization of 50 and a viscosity of 100 cs ($1 \times 10^{-4}$ m$^2$/sec), 5 parts of n-propanol, as a profoamer, 10 parts of the reaction product of $C_8F_{17}(CH_2)_2Si(CH_3)_2Cl$ and a silanol-containing organopolysiloxane resin, 1 part of a chloroplatinic acid/divinyltetramethyldisiloxane complex catalyst, and 10 parts of fumed silica with specific surface are of 200 m$^2$/g.

Part B of a curable foamable organosiloxane composition of this invention was prepared by mixing the following ingredients to homogeneity: 100 parts of the dimethylvinylsiloxy-terminated dimethylpolysiloxane used in part A, 10 parts of a trimethylsiloxy-terminated methylhydrogen-polysiloxane with a degree of polymerization of approximately 30, and 5 parts fumed silica with specific surface area of 200 m$^2$/g.

Parts A and B of the composition were placed in storage tanks 5 and 6, respectively, shown in FIG. 1 of the accompanying drawings, and were then separately transported in equal amounts by pumps 7 and 8 into the interior of mixing chamber 1. Air regulated to a pressure of 2 kg/cm$^2$ was simultaneously injected at the reported rate by pump 9 into the interior of mixing chamber 1. Rotatable blades 2 were rotated at approximately 1,000 rpm in order to finely disperse the air in the mixture while at the same time blending parts A and B.

The gas/liquid mixture generated in the mixing chamber was passed through nozzle 3 and was extruded as a bead with a diameter of 5 mm onto the seal region of an automotive dust cover made of polypropylene.

This bead formed a foam gasket in three minutes by foaming while curing.

Table 1 reports the quantity of gas added, the results from measurement of the foam density of the final cured foam, the average cell diameters of two of the samples, and the results of an examination of the condition of the foam. The sample prepared by introducing 51.6 mL of air into the foamable composition is outside the scope of the present invention and is included for comparative purposes.

TABLE 1

| quantity of air mL/100 g A + B combined Parts A + B | condition of the foam | | |
|---|---|---|---|
| | Density (g/cm$^3$) | Cell Size (mm) | Appearance Of Cells |
| 3.1 | 0.40 | | fair |
| 6.5 | 0.37 | | fair |
| 13.2 | 0.34 | 0.1 | excellent |
| 18.1 | 0.34 | | excellent |
| 25.5 | 0.34 | 0.3 | excellent |
| 31.2 | 0.34 | | excellent |
| 38.7 | 0.34 | | somewhat coarse |
| 45.2 | 0.31 | | somewhat coarse |
| 51.6* | 0.28 | 1.5 | coarse |

\* = Included for comparative purposes

EXAMPLE 2

A foamable organopolysiloxane composition was prepared as in Example 1, but in this case replacing the chloroplatinic acid/divinyltetramethyldisiloxane complex catalyst used in Example 1 with a spherical microparticulate catalyst (particle size = 1 micrometer, softening point of the silicone resin = 80° C.) consisting of a silicone resin powder that contained chloroplatinic acid/divinyltetramethyldisiloxane complex catalyst.

This composition was extruded from the nozzle into a bead by the same procedure as in Example 1. In this example, 25.5 mL air was added per 100 g of the A+B liquid mixture. The gasket was fabricated by foaming and curing by heating the dust cover for 5 minutes in an oven at 100° C.

The average diameter of the cells in the resulting foam was 0.3 mm and the size distribution was uniform.

EXAMPLE 3

Part A of a curable organosiloxane composition was prepared by blending the following ingredients to homogeneity into 100 parts of a dimethylvinylsiloxy-terminated dimethylpolysiloxane exhibiting a degree of polymerization of 600, a viscosity of 3,000 cs ($3 \times 10^{-3}$ m$^2$/sec), 30 parts of a silanol-terminated dimethylpolysiloxane exhibiting a degree of polymerization of 110 and viscosity of 100 cs ($1 \times 10^{-4}$ m$^2$/sec), 8 parts n-propyl alcohol, 10 parts of the reaction product of $C_8F_{17}(CH_2)_2Si(CH_3)_2Cl$ and a silanol-containing organopolysiloxane resin, and 1 part of a chloroplatinic acid/divinyltetramethyldisiloxane complex as the catalyst.

Part B of the composition was prepared by mixing the following ingredients to homogeneity: a total of 130 parts of the mixture of the two silanol-terminated dimethylpolysiloxanes used in part A and 30 parts of a trimethylsiloxy-terminated methylhydrogenpolysiloxane with a degree of polymerization of approximately 30.

A organosiloxane composition was prepared as described in Example 1 and was extruded through the nozzle to fill half the height of the sealing groove on a plastic lamp cover. The lamp cover was held at room temperature, and the foam gasket was formed in 3 minutes by the simultaneous development of foaming and curing. Air was introduced into the mixing chamber at a concentration of 13.2 mL per 100 g of the combined weight of parts A and B. The average diameter of the cells in the resulting foam was 0.1 mm. and the size distribution was uniform.

That which is claimed is:

1. A method for fabricating foam gaskets, said method comprising the sequential steps of
   a) transporting to a mixing chamber a base portion and a curing agent portion of a curable organosiloxane foamable composition where said composition foams by reaction of silicon bonded hydrogen atoms with hydroxyl groups and cures by a hydrosilation reaction,
   b) blending said base portion with said curing agent portion in said mixing chamber to form said foamable composition,
   c) extruding said foamable composition from said mixing chamber through an orifice onto a seal region of a substrate, and
   d) allowing said composition to foam and cure to form a gasket with a homogeneous distribution of uniformly small cells, whereby prior to extruding from said mixing chamber, said base portion, said curing agent portion or said foamable composition is injected with an amount of an inert gas under a pressure of from 1 to 7 kg/cm$^2$ equivalent to from about 13 to about 31 ml of gas per 100 g of said composition and said gas is uniformly dispersed throughout said composition prior to extrusion of said composition from said mixing chamber.

2. A method according to claim 1 where said composition comprises
   (A) 100 weight parts of an organopolysiloxane containing at least 2 alkenyl groups in each molecule,
   (B) from 0 to 100 weight parts of an organopolysiloxane that contains at least 1 silanol group in each molecule,
   (C) from 1 to 20 weight parts of an alcohol,
   (D) from 0 to 20 weight parts of an organopolysiloxane that contains a silicon-bonded $CnF_{2n+1}R$ group, where n is an integer from 1 to 10, and R is an alkylene radical,
   (E) an amount of a platinum group metal catalyst sufficient to catalyze foaming and curing of said composition, and
   (F) an amount of an organohydrogenpolysiloxane equivalent to a range of from 0.5:1 to 50:1 for the molar ratio of silicon-bonded hydrogen atoms in said composition to the sum of the number of moles of alkenyl groups in ingredient A plus the number of moles of hydroxyl groups in ingredients B and C.

3. A method according to claim 2 where said base portion consists essentially of said alkenyl-containing organopolysiloxane, said alcohol, said silanol-containing organopolysiloxane, and said catalyst, and said curing agent portion consists essentially of said alkenyl-containing organopolysiloxane and said organohydrogenpolysiloxane.

4. A method according to claim 2 where the average cell diameter in said gasket does not exceed one millimeter.

5. A method according to claim 3 wherein the platinum group metal catalyst comprises a spherical microparticulate catalyst made from silicone resin that contains at least 0.01 weight % (as platinum metal atoms) platinum group metal catalyst wherein the softening point of the silicone resin is 50° C. to 200° C. and the particle diameter of the spherical microparticulate catalyst is 0.01 to 10 micrometers.

* * * * *